United States Patent [11] 3,595,565

| [72] | Inventor | Harry R. Bergland Novi, Mich. |
| [21] | Appl. No | 851,818 |
| [22] | Filed | Aug. 21, 1969 |
| [45] | Patented | July 27, 1971 |
| [73] | Assignee | Burroughs Corporation Detroit, Mich. |

[54] SHEET ITEM TRANSPORT AND ALIGNING MECHANISM
15 Claims, 6 Drawing Figs.

[52] U.S. Cl. ................................................. 271/49, 271/76
[51] Int. Cl. ............................................. B65h 9/16
[50] Field of Search ............................................. 271/45, 48, 49, 52, 76, 86

[56] References Cited
UNITED STATES PATENTS

| 1,383,267 | 6/1921 | De Escobales | 271/45 |
| 1,562,271 | 11/1925 | Aldrich | 271/48 |
| 2,995,364 | 8/1961 | Frederick et al. | 271/52 |
| 3,415,509 | 12/1968 | Tyburski et al. | 271/45 |

*Primary Examiner*—Joseph Wegbreit
*Assistant Examiner*—Bruce H. Stoner, Jr.
*Attorney*—Paul W. Fish ABSTRACT: This invention is directed to sheet item transport mechanisms and particularly to such mechanisms for successively advancing sheet items, such as documents and the like, at high speeds in a given direction and at the same time laterally shifting the items to an edge guide for transport in precise alignment therewith for later attention in the transport path. More specifically, the transport mechanism of this invention employs endless carriers in the form of belts of rounded or circular cross section which engage opposite sides of a document in offset staggered relation to one another and in overlapping relation to the plane of the document with the result that the document is slightly corrugated longitudinally in the direction of its motion. The endless belts are mounted in parallel relation to one another on pulleys located on the outer sides of sideplates forming the transport path and such that the sections of the belts which engage the document project into the space between the sideplates in alternately staggered overlapping relation to one another. For the purpose of precise alignment of the documents in the transport path, the endless belts are inclined to an edge guide so as to drive the documents theretoward as they are advanced along the transport path. Other features of the invention include a provision for laterally separating the sideplates in order to gain access to the space therebetween and also a provision for continuously supporting the document engaging sections of the endless belts in the aforesaid staggered overlapping relation throughout the distance separating the pulleys about which the belts are trained.

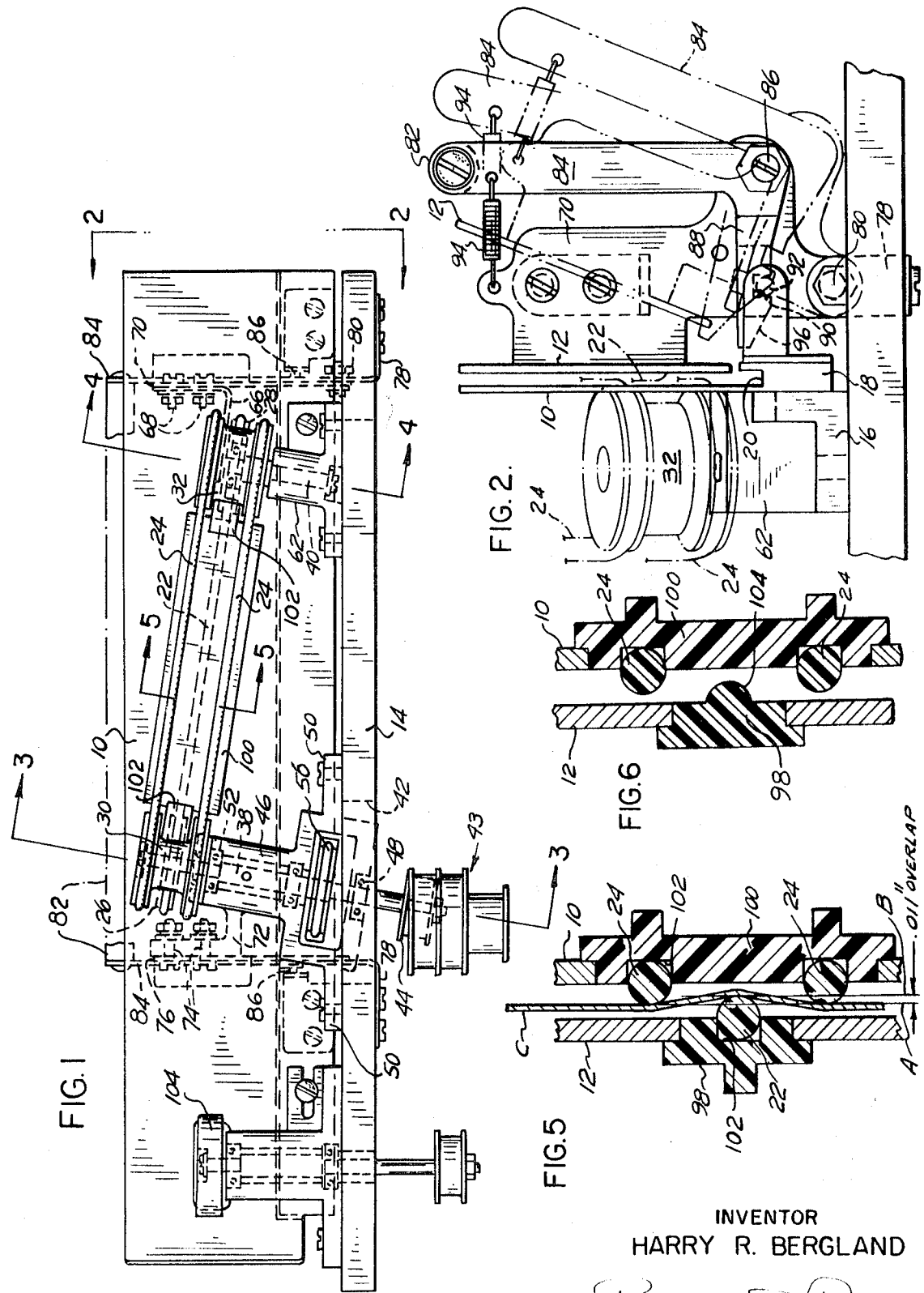
INVENTOR
HARRY R. BERGLAND

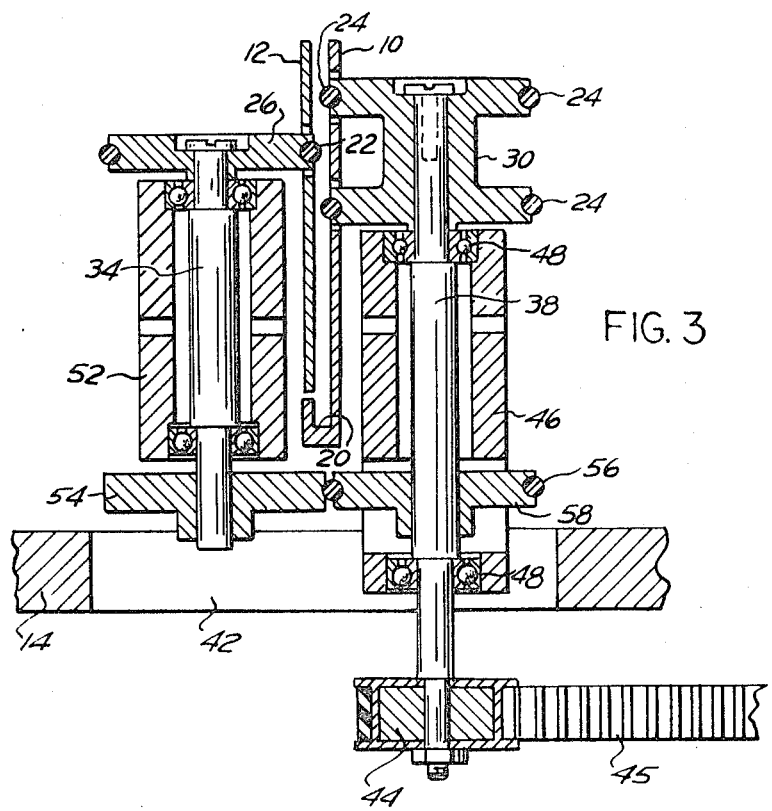

SHEET ITEM TRANSPORT AND ALIGNING MECHANISM

BACKGROUND OF THE INVENTION

This invention is directed to that field of art pertaining to the conveyance of documents at high rates of speed, especially documents of flexible nature such as bank checks and the like, and particularly to such apparatus for accomplishing this purpose including a document-aligning guide for directing successive documents along a precisely prescribed path for later attention by sensing or printing devices further along the path.

Various attempts have been made in the past for providing apparatus of this nature for transporting documents, such as bank checks, at high speed and while so doing to bring the documents into a desired aligned condition. In the past, it has been the practice to employ pairs of rotatable elements, such as rollers, for driving the documents at high speeds and which at the same time may shift them into a particular desired alignment in the transport path for subsequent operations. Knuckle rollers spaced along the document transport path have been employed for this purpose, and exemplary thereof is the apparatus disclosed in the patent to H. M. Frederick et al. U.S. Pat. No. 2,995,364 of common ownership herewith.

The use of rotary elements for document transport, such as the knuckle roller arrangement disclosed in the aforesaid patent, have provided improved operations in the field of art to which this invention relates. However, several sets of rollers were required for long distance transport of documents and each set of rollers had to be driven from a power source. Accordingly, these additional and comparatively expensive roller provisions and the requirement to drive all of them from a remote power source resulted in a higher cost product and higher expense for maintenance.

SUMMARY OF THE INVENTION

An important object of the invention is to provide an improved sheet item or document transport mechanism capable of driving such items at high speeds and which utilizes a minimum number of parts for accomplishing this purpose.

Another important object of the invention is to provide an improved document transport mechanism which applies a continuous driving force to the documents over a comparatively long distance.

A further important object of the invention is to provide an improved document aligning and transport mechanism which is capable of handling intermixed sizes of sheet items, such as bank checks, and further is capable of handling such paper items when in relatively mutilated or crumpled condition.

A still further important object of the invention is to provide a document transport and aligning mechanism of this kind having improved means for enabling the endless carriers or belts on opposite side of the transport path to be separated laterally from one another to gain access to the space therebetween.

In carrying out the objects of the invention, the transport mechanism comprises in the main at least two endless belts, but preferably three or more endless belts, arranged to engage one or both sides of a document in the transport path on distinctly different levels and in such a manner that the sections of belts in the path engage different areas of the document and impart a slight longitudinal corrugation thereto. Preferably, as illustrated by the disclosed embodiment of the invention, each endless belt is of circular cross section and so mounted on pulleys as to overlap the plane of the document upon which they operate to produce a combined advancing and side gauging operation. To assure continuous uninterrupted engagement of the belts with the document through their lengths, provision is made for supporting the belts in this overlapping relationship throughout the distance separating the pulleys about which they are trained.

Preferably, as illustrated by the disclosed embodiment of the invention, the endless conveying belts are mounted on the outer sides of a pair of juxtaposed guide plates which form the transport path through which the documents are fed. The pulleys for the endless belts are so mounted with respect to the guide plates that the belt sections which engage the documents project beyond the inner surfaces of the guide plates in the aforesaid alternately staggered overlapping relationship. Slots are formed in the guide plates for permitting the document-engaging belt sections to extend into the transport path. Preferably these belt sections are backed up by low frictional material so as to maintain the aforesaid overlapping relationship throughout the distance separating the pulleys supporting each set of endless belts. Moreover, a desired feature of the invention is the provision for pivotal supporting one of the guide plates for swinging movement from its operative position adjacent to the other guide plate to an opened position away therefrom so that access may be had to the space between the plates for maintenance servicing and in the event of a document jam therein.

The above-listed objects, advantages and other aspects of the invention will be fully explained in the following detailed description. For more complete understanding of the invention reference may be had to the following detailed description in conjunction with the drawings.

BRIEF DESCRIPTION OF THE DRAWINGS

FIG. 1 is a side elevation of a preferred embodiment of the invention showing in full and dotted outline the positions occupied by the endless document conveying belts thereof;

FIG. 2 is an end view of the apparatus illustrated in FIG. 1 and showing in dotted outline an opened position capable of being assumed by one of the guide plates for gaining access to the space between the guide plates;

FIG. 3 is a vertical sectional view taken along line 3-3 of FIG. 1 and showing the mounting of the drive pulleys for cyclically moving the endless belts in directions for conveying documents along the transport path;

FIG. 4 is a vertical sectional view taken along line 4-4 of FIG. 1;

FIG. 5 is an enlarged fragmentary sectional view taken on line 5-5 of FIG. 1 and illustrating the different levels of the endless belts in the transport path and their overlapping relation to one another and also the backup provision for assuring continuous engagement of each belt with a document in the stretch between its pulleys; and FIG. 6 is a view similar to FIG. 5, showing a modification of the transport path wherein one of the endless belts is replaced by a stationary ridge of low-friction material.

DESCRIPTION OF PREFERRED EMBODIMENT

With reference initially to FIGS. 1 and 2, the transport mechanism includes a pair of side or guide plates indicated at 10 and 12, the latter being movable with respect to the stationary plate 10 as will be later explained herein. The guide plates are mounted in close parallel relationship to one another to form the document transport path. The stationary plate 10 is supported from a horizontal base member 14 by an L-shaped angle bar 16 which may run the length of the guide plate and be bolted to the base member. The stationary guide plate 10 is thickened along its lower margin in the direction of the other plate 12 as indicated at 18 and provided along the upper edge thereof with an upwardly opening U-shaped channel 20 which serves as the aligning guide into engagement with which the edges of the documents conveyed along the transport path are brought for precise alignment as they are advanced therealong.

Instead of rollers, such as knuckle rollers, and opposed flat endless belts, for engaging and driving documents between guiding plates as heretofore, the present invention employs movable endless belts extending longitudinally of the transport path which are substantially circular in cross section and which are disposed in offset relation to one another in order to engage different areas of the document. In a preferred embodiment of the invention illustrated herein, three such circularly crosssectioned belts are employed, one on one side of the transport path and two on the other side thereof. The single belt is indicated in dotted outline at 22 in FIG. 1 and cross sectioned in FIGS. 3, 4 and 5. The two remaining endless belts are indicated at 24–24 in full line in FIG. 1 and in cross-sectional condition in FIGS. 3, 4 and 5. The material of the endless belts should be abrasive resistant to withstand long usage as driving elements in the transport path and a preferred material for this purpose is an elastomeric urethane.

The sectional views of FIGS. 3, 4 and 5 show the mounting relationship of these endless conveying belts with respect to one another and the guide plates 10 and 12, and particularly the fact that the pair of belts 24–24 are spaced apart from one another for engaging different areas of one side of the document and that the remaining single belt 22 is disposed on a level between the pair of belts and engaging an area on an opposite side of the document midway between the areas engaged by the pair. Moreover, it is further evident from FIG. 1 that these endless belts extend parallel to one another, and for the purpose of aligning the documents all three belts extend at an inclination to channel 20. In the illustrated embodiment of the invention, this angle is set at 9°. Although three such conveying belts are shown in this embodiment, it is understood that the invention is not restricted to this number. When a different number of belts is employed, they are arranged in this offset, alternately staggered, overlapping relation depicted by the three belts illustrated herein.

The three belts of the illustrated embodiment of the invention are of the same length, the single belt 22 being carried by a pair of spaced apart pulleys 26 and 28 and the pair of belts 24–24 being carried by a pair of spaced apart spools 30 and 32 each having their respective rims shaped to serve as pulleys about which the two belts are trained. It is evident from the journal mounts for the endless belts that their respective loops lie in different but parallel planes and that the inner belt engaging sections of the loops are alternately staggered with respect to one another in the transport path.

Although two separated rotating devices are employed for mounting the endless belts on each of the opposite sides of the transport path, only one of these devices need be powered to drive the belts in the desired direction. With reference to FIGS. 3 and 4 it is evident that the pulleys 26, 28, 30 and 32 are of such a size and are so mounted with respect to the guide plates that they dispose the document-engaging sections of their respective endless belts mainly within the planes of the guide plates 10 and 12 but so as to project beyond the inner surfaces thereof. Moreover, the pulleys dispose their respective endless belts so that these projecting sections slightly overlap one another as shown by the reference lines A and B in FIG. 5, a preferred extent of overlap being 0.011 inches. The result is the formation of a slight corrugation in each document in the transport path extending longitudinally in its direction of movement therein as illustrated by document C in FIG. 5.

The pulleys are mounted on the upper ends of separate shafts but below the top level of the side plates 10 and 12 so as to leave clear any interfering elements around the upper portions of the sideplates. The shaft for the pulley 26 is indicated at 34 and that for the pulley 28 is indicated as a stub shaft 36. The shaft for the spool 30 is indicated at 38 and for the spool 32 at 40. Pulley 26 and spool 30 are fixed to their respective shafts whereas pulley 28 and spool 32 are free to rotate on their respective shafts.

As earlier indicated herein, an advantage of this invention over roller arrangements of the prior art is the ability to power only one end of the endless belts employed to cover a relatively long stretch of the transport path whereas in the case of knuckle rollers there arises the need to provide several pairs of such rollers and to drive each opposed pair from a source of power. In the presently described embodiment of the invention, the shafts 34 and 38 for the pulley 26 and the spool 30 respectively serve as the powered instrumentalities for driving the endless belts. The remaining pulley 28 and spool 32 serve as idlers having no function other than as journal mounts about which the endless belts are trained.

With more specific reference to FIG. 3, shaft 38 extends through a hole 42 in the base member and carries a toothed pulley 44 fixed to the lower end thereof. A driving belt 45 having internal teeth engages the teeth of pulley 44 and connects shaft 38 to one of a cluster of pulleys 43 (FIG. 1) on a common drive shaft representing a source of motive power not only for the document transport mechanism illustrated herein but for other moving parts of a system in which this mechanism forms a part. Drive shaft 38 extends axially through a tubular journal support 46 having bearings 48–48 in the upper and lower ends thereof for journaling the shaft 38 for rotation therein. The journal support 46 forms a part of a casting having lateral extensions or feet 50–50, shown in FIG. 1, which are bolted to the base member 14. The previously mentioned opening 42 in the base member is sufficiently large enough so as to receive the lower portions of the casting of which the journal support 46 is a part. It evident that upon rotation of the driving belt 45 that shaft 38 will be rotated causing the spool 30 and its two pulley rim portions to drive the endless belts 24–24 in the same direction and at the same rate of speed.

The single endless belt 22 is moved at the same rate of speed and its document-engaging section in the same direction as the corresponding sections of the belts 24–24. This is accomplished by journaling the shaft 34 in bearings similar to 48–48 within a tubular support 52 which is mounted as will be later described upon the movable guide plate 12. The lower end of shaft 34 projects below its journal housing and carries a wheel 54 fixed thereto whose periphery extends underneath the document guide channel 20. This wheel is engaged by a resilient tire 56 carried on a periphery of a wheel 58 secured to the shaft 38 and jointly rotatable therewith. The overall diameters of the two wheels are equal. It is evident from the relation of these parts that torque applied to drive shaft 38 will be transmitted by its wheel 58 to the wheel 54 of shaft 34, rotating the latter two elements at the same time speed but in the opposite direction to that of shaft 38 so that the document-engaging section of the single endless belt 22 will move in same direction and rate of movement as the corresponding sections of the two belts 24–24.

As previously mentioned, the journaled elements at the other ends of the endless belts about which they are trained serve as passive parts of the mechanism rotating only when their respective belts are moved. The spool 32 is journaled by a bearing 60 about the shaft 40 which is mounted in a block 62 forming part of the angle bar 16. The pulley 28 for the single belt 22 is journaled in a bearing assembly 64 surrounding the stub shaft 36. The stub shaft is fixed to one end of a metal strap 66 which as shown in FIG. 1 is generally L-shaped and has its opposite end secured by bolts 68 to a lateral extending bracket 70 carried on the outer side of the movable guide plate 12 adjacent to one end thereof.

As earlier mentioned herein, the journal mount 52 for shaft 34 is secured to the movable guide plate 12. This is accomplished in a manner similar to that provided for journal support for the pulley 28 and comprises a generally L-shaped extension 72 which may be integrally cast with the tubular mount 52. The outer end of the extension 72 is secured by bolts 74 to a bracket 76 projecting outwardly from the movable guide plate 12 which is similar to the previously described bracket 70 but located at the opposite end of the guide plate. The two brackets 70 and 76 are located beyond the pulleys for the endless belts 22 and 24–24 and their respective bottom portions are similarly hinged to the base member 14 for swinging the plate 12 about a common axis from the operating full line position shown in FIG. 2 to the dotted line position shown therein. The pivotal mounting for each bracket may be formed by a metal strap 78 extending through openings in the base member 14 and secured at one end to the under side thereof and carrying a pin 80 on the other upper end thereof which may be exteriorly threaded for cooperation with a nut but nevertheless providing the pivotal mount for the bracket attached thereto.

The swinging movement of the guide plate 12 is controlled by a handle of general U-shaped formation, constructed and inverted so that the closed end 82 of the U serves as the handle and further so that the side members or legs 84—84 thereof extend along the sides of the bracket members 70 and 76 and each hinged thereto on a common axis by means of a pin connection such as shown at 86 in FIG. 2. The lower ends of the legs 84—84 of the handle are each shaped with a right angled projection or finger 88 which serves to releasably lock the guide plate 12 in the full line position shown in FIG. 2. The underside of each finger 88 is provided with a notch 90 which is receivable over a stud 92 carried by the adjacent bracket member. Forming a loose connection between each leg 84—84 of the handle and upper portion of each bracket 70 and 76 is a coiled spring 94. These coiled springs enable the handle to be initially moved relative to the brackets to lift the projection 88 off of the studs 92 following which the springs will then pull the brackets and the guide plate 12 therewith to the opened dotted line position shown in FIG. 2. Contrariwise, when the handle is swung back, the inclined forward end 96 of each finger 88 will ride up over its associated stud 92 until the latter is received in the notch 90 thereby releasably securing the parts in the full line position shown in FIG. 2. During the hinged movement of the guide plate 12 away from guide plate 10, the single endless belt 22 and its pulley mounts are carried therewith thereby separating the engagement of the wheel 54 with the wheel 58 of the drive shaft 38. The disposition of these two wheels on their respective shafts is such that upon return movement of the guide plate 12 to its operating position, wheel 54 will engage the resilient tire 56 of wheel 58 thereby reinstating the driving connection between the endless belts 24—24 on one side of the transport passage with the endless belt 22 on the other side thereof.

In order to assure the continuous overlapping relation of the endless belts on opposite sides of the transport path throughout the distance separating the pulleys upon which they are mounted, the two guide plates 10 and 12 are provided with material of low friction over which the document-engaging sections of the belts ride. In attaining this object, each guide plate 10 and 12 is provided with an elongated slot running substantially the length of the endless belts and parallel thereto so that the slots assume the same inclination as the belts with respect to the aligning channel 20. Fitted into each slot and lying substantially flush with the inside surface of each guide plate is a strip of low-friction material such as the plastic composition known in the trade as Delrin AF manufactured by Du Pont of Wilmington, Del. Other suitable low-friction material may be used if desired.

With respect to FIG. 5, one such strip for the single endless belt 22 is indicated at 98 and the other for the pair of belts 24—24 is indicated at 100. Each strip is dimensionally shaped, as illustrated in FIG. 5, to interfit with the slot of the guide plate in which it is mounted so as to bring its inner surface substantially flush with the inside face of the guide plate. Suitable metal straps 102 at one or both ends of the strips 98 and 100 may be used to secure them in place against the outer faces of the guide plates as illustrated in FIG. 1. During the operation of the mechanism, the document engaging sections of the belts 22 and 24—24 slide over the low-friction plastic strips 98 and 100 between the pulleys and are maintained by the strips in the overlapping relation illustrated in FIG. 5 to impart a slight corrugation to each document C advanced thereby through the path formed by the guide plates. Preferably, the document-engaging sections of the belts ride in grooves formed in the low friction strips 98 and 100, each groove having a width corresponding to the cross-sectional diameter of the belts and a depth approximating the radius thereof with the result that throughout the stretch of the belts in the transport path between their respective pulleys they are held from misalignment and in the protruding slightly overlapping condition illustrated in FIG. 5.

In certain circumstances, particularly where slower transport speeds are acceptable, it is feasible to replace the belt section on one side of the document-conveying path with a stationary protuberance or ride of low-friction material which will cooperate with the moving belt sections on the opposite side of the path to drive the documents therealong. FIG. 6 illustrates an example of this modification. In lieu of the single moving belt 22, the sidewall 12 is provided with a stationary protruding ridge 104 which occupies the same position in the path as the document-engaging section of belt 22. As shown in FIG. 6, the ridge may constitute an integral part of the low-friction strip 98 and extend substantially the length thereof and be shaped with a rounded exterior simulating the half section of the belt which it replaces. So constructed and disposed, the stationary ridge will cooperate with the moving belts 24—24 to slightly convolute a document being conveyed through the transport path. Lacking the positive drive on both sides of the transport path, this modification is normally not as fast as the earlier described embodiment of the invention, but it does have the advantage of eliminating a driving belt and its attendant pulley mounts thus reducing the overall cost of the mechanism.

In operation of the embodiments of the invention disclosed herein, the documents are advanced from left to right through the transport path formed by the guide plates 10 and 12. These plates may be outwardly flared at the entrance end to facilitate feeding of documents thereinto, and at this entrance position a pair of opposed rollers, one of which is shown at 104 in FIG. 1, may be mounted for gripping the documents as they are successively introduced into the path and advancing them into position to be engaged by the endless belts 22 and 24—24. One of the rollers, such as roller 104, may be driven by a belt (not shown) from the cluster of pulleys 43 representing the source of power for the transport system. A document transport speed of 150 inches per second is attainable by the apparatus disclosed in FIGS. 1 to 5.

In the operation of the embodiment of the invention disclosed herein, the documents are transported between the guide plates 10 and 12 generally in a vertical plane. These documents may be of various sizes, thicknesses and stiffness, and as they are engaged by the endless belts 22 and 24—24 they are laterally shifted downwardly between the guide plates until their lower edges engage and are guided by the U-shaped channel guide 20. During the transit between the guide plates, each document is slightly bent or corrugated longitudinally in the direction of its motion by the diametral interference existing between the endless belts on opposite sides of the transport path. When the belts bend or corrugate a document they exert a force or pressure on the document normal to its plane thereby providing the frictional force to urge the documents to advance at the same speed as the belts. The thicker the document the more it resists the forces imposed by the endless belts as they bend it and consequently a greater driving force is exerted by the belts thereon.

The slight inclination of the belts to the U-shaped channel guide 20, in this instance 9°, serves to drive each document downwardly against the bottom surface of the channel as well as to propel the document toward the right end of the apparatus as viewed in FIG. 1. Once the bottom edge of the document fully bears on the channel bottom, the document can move only toward the right but in the desired precisely aligned condition. Since the skew angle of the belts to the guide line is small, the force vector to the right is substantially larger than the downward force vector and the document will move exclusively to the right when in engagement with the guide line 20. Once the document is guided by the channel 20 a slippage occurs between the document and the endless belts equal to the previous vertical travel of the document. In fact, the machine illustrated herein is designed to permit the document to be stopped even while the belts run continuously without damage to the document. Furthermore, it is evident that in this design all of the endless belts are powered so that they exert a continuous uninterrupted driving force on the document as it is transported between their respective sets of pulleys. The endless belts, with the assistance of their backup low-friction supports 98 and 100, may be heuristically thought of as an elongated pair of opposing alternately staggered knucklelike elements providing the advantage over knuckle rollers of the prior art of continuous uninterrupted engagement with the documents over relatively long distances of movement. Moreover, the use of such endless belts for such purpose reduces the number of driven parts and associated operating connections and provides a less costly apparatus.

While a particular embodiment of the invention has been shown and described, it will be understood, of course, that it is not desired that the invention be limited thereto inch modifications may be made, and it is, therefore, contemplated by the appending claims to cover any such modifications as fall within the true spirit and scope of the invention.

What I claim is:

1. In a document transport system:
means forming a transport path for conveying documents therealong;
a pair of similar endless belts positioned on one side of the document transport path and disposed so that the sections thereof adjacent to the path extend parallel to one another but on spaced-apart levels for engaging separated areas of the same side of a document in the transport path;
means on the other side of the document transport path for engaging the opposite side of a document in the transport path on a level parallel to and approximately midway between the two levels of the document engaging sections of said pair of belts and for approximately the length thereof;
means for moving said pair of endless belts so that the document-engaging sections thereof adjacent to the document transport path are advanced in the same direction and at the same speed; and
means supporting the document-engaging sections of said pair of endless belts and the document-engaging means so that the document-engaging belt sections straddlingly overlap upon the document-engaging means on the other side of a document in the transport path and causing the latter to deflect the area of the document engaged thereby into the space between the document-engaging belt sections with the result that the document is slightly corrugated longitudinally in its direction of movement as it is conveyed by the belts along the transport path.

2. The invention defined in claim 1 characterized in that the belts are substantially circular in cross section.

3. The invention defined in claim 1 characterized in that said document-engaging means is a document-engaging section of another endless belt.

4. In a document transport system:
means forming a transport path for conveying documents therealong;
a pair of endless belts positioned on one side of the document transport path and disposed so that the sections thereof adjacent to the path extend parallel to one another but on spaced-apart levels for engaging separated areas of the same side of a document in the transport path;
a stationary elongated protuberance on the other side of the document transport path so disposed that it engages the opposite side of a document in the transport path on a level parallel to and approximately midway between the two levels of the document-engaging sections of said pair of belts, said protuberance extending for approximately the length of said document-engaging sections of said pair of endless belts and being composed of material having a relatively low coefficient of friction;
means for moving said pair of endless belts so that the document-engaging sections thereof adjacent to the document transport path are advanced in the same direction and at the same speed; and
means for supporting the document-engaging sections of said pair of endless belts so that they overlap upon the elongated protuberance engaging the other side of a document in the transport path with the result that as a document is transported along the path it is slightly corrugated longitudinally in its direction of movement.

5. In a document transport system:
means forming a transport path for conveying documents therealong;
a pair of endless belts positioned on one side of the document transport path and disposed do that the sections thereof adjacent to the path extend parallel to one another but on spaced-apart levels for engaging separated areas of the same side of a document in the transport path;
a single endless belt positioned on the other side of the document transport path and disposed so that the section thereof adjacent to the path engages the opposite side of a document in the transport path on a level parallel to and approximately midway between the levels of the document engaging sections of said pair of belts;
means for moving said endless belts so that the document-engaging sections thereof adjacent to the document transport path are advanced in the same direction and at the same speed; and
means supporting the document-engaging sections of the endless belts so that the document-engaging section of the single belt overlaps upon the common plane of the document engaging sections of said pair of endless belts with the result that as a document is transported along the path it is slightly corrugated longitudinally in its direction of movement.

6. The invention defined in claim 5 characterized in that the belts are all circular in cross section.

7. In a high-speed document transport system:
means forming a transport path for conveying documents therealong and including a side edge aligning guide extending in the direction of the path;
a pair of endless belts positioned on one side of the document transport path so that the sections thereof adjacent to the path extend in spaced parallel relation to one another but at an inclination to the side edge aligning guide and engage separated areas of the same side of a document in the transport path;
an endless belt cooperating with said pair of belts and positioned on the other side of the document transport path so that the section thereof adjacent to the path extends parallel to and at the same inclination as the corresponding sections of said pair of belts and so that the section engages an area of the opposite side of a document in the transport path approximately midway between the areas of the document engaged by said pair of belts;
means for moving said endless belts so that the document-engaging sections thereof move in the same direction and at the same speed thereby to advance a document in the same direction along the transport path and at the same time urge the document into side edge engagement with the aligning guide; and
means for supporting the document-engaging sections of the endless belts so that the document-engaging section of the single belt slightly overlaps the document-engaging sections of said pair of endless belts with the result that as a document is transported along the path it is slightly corrugated longitudinally in its direction of movement.

8. In a sheet item transport system:
means forming a transport path for conveying sheet items therealong and including a side edge aligning guide extending in the direction of the path,
an endless belt on each side of the transport path and each such belt mounted upon a pair of pulleys spaced apart along the path, each pair of pulleys disposing a section of its endless belt in the transport path with a rounded portion thereof protruding into the path in offset overlapping relationship to a correspondingly rounded portion of the endless belt on the other side of the transport path with the result that a sheet item in the path is engaged by said belt sections and corrugated thereby longitudinally in the direction of motion along the path, means mounting the pulleys on axes of rotation canted relative to said edge guide for inclining the endless belts theretoward thereby causing the endless belts to advance sheet items along the transport path and toward and into engagement with said side edge aligning guide, means for positively rotating one pulley of a first one of the pairs of pulleys to advance the sheet item engaging section of its respective belt in one direction, and means circumventing the aligning guide and drivingly connecting said positively rotated pulley with one of the pulleys of the second pair of pulleys on the other side of the transport path so that the sheet item engaging section of the belt of the second pair of pulleys is advanced on the same direction and at the same speed as the corresponding section of the first pair of pulleys 9. In a sheet item transport system:

means forming a transport path for conveying sheet items therealong, an endless belt on each side of the transport path mounted upon a pair of pulleys spaced apart along the path, each said pair of pulleys protruding a section of its endless belt into the transport path in offset overlapping relationship to the corresponding section of the endless belt on the other side of the transport path with the result that a sheet item in the path is corrugated longitudinally in the direction of motion along the path, and means for positively rotating at least one pulley of each pair of pulleys to cyclically move the endless belts so that the sections thereof protruding into the transport path move in the same direction and at the same rate of speed.

10. The invention defined in claim 9 characterized in that a backup support of low friction material is provided over which said protruding section of each endless belt rides.

11. The invention defined in claim 10 characterized in that for each such belt section the backup support is provided with a groove in which the section is partially received as it rides therealong.

12. Apparatus for sequentially moving sheet items in a given direction comprising:

a pair of opposed, parallel extending, closely spaced apart guide plates forming a transport path for conveying sheet items therealong in an approximately vertical plane;

a pair of pulleys mounted on the outside of one or both of said guide plates having their respective axes of rotation extending in a general vertical direction;

an endless belt trained around each of said pairs of pulleys and so that a section of each belt protrudes beyond the inside surface of the guide plate with which it is associated into overlapping relationship with the sheet item engaging section of the other belt with the result that a sheet item in the transport path is longitudinally corrugated in the direction of the transport path;

the endless belts associated with each pair of pulleys being vertically spaced apart relative to other endless belts so as to engage different surface areas of a sheet item in the transport path; and means for positively rotating at least one pulley of each pair of pulleys so as to drive each said section of the endless belts in said given direction and at the same speed.

13. The invention defined in claim 12 characterized in that one of the guide plates is mounted for movement away from the other guide plate to increase the space therebetween and sufficiently far enough away to retract the sheet item engaging section of the belt associated therewith from overlapping relationship with the like section of the other belt.

14. The invention defined in claim 12 characterized in that a backup support of low-friction material is provided on one or both of said guide plates over which the item engaging section of each endless belt rides.

15. Apparatus for sequentially moving sheet items in a given direction comprising:

a pair of opposed, parallel extending, closely spaced-apart guide plates forming a transport path for conveying sheet items therealong in an approximately vertical plane;

a pair of pulleys mounted on the outside of one or both of said guide plates having their respective axes of rotation extending in a general vertical direction;

an endless belt trained around each of said pairs of pulleys and so that a section of each belt protrudes beyond the inside surface of the guide plate with which it is associated for engaging the adjacent side of a sheet item in the transport path;

the endless belts associated with each pair of pulleys being vertically spaced apart relative to other endless belts so as to engage different surface areas of a sheet item in the transport path;

means for positively rotating at least one pulley of each pair of pulleys so as to drive each said section of the endless belts in said given direction and at the same speed, and means providing a backup support of low-friction material on one or both of said guide plates over which the item engaging section of each endless belt rides.